United States Patent [19]

Sunaga

[11] 4,424,537
[45] Jan. 3, 1984

[54] MAGNETIC RECORDING DEVICE

[75] Inventor: Yoshimistu Sunaga, Saitama, Japan

[73] Assignee: Pioneer Electronic Corporation, Tokyo, Japan

[21] Appl. No.: 336,985

[22] Filed: Jan. 4, 1982

[30] Foreign Application Priority Data

Jan. 8, 1981 [JP] Japan .................................. 56-1474

[51] Int. Cl.³ .......................... G11B 5/47; G11B 5/02
[52] U.S. Cl. ........................................ 360/66; 360/68
[58] Field of Search ............................ 360/67, 68, 66

[56] References Cited

U.S. PATENT DOCUMENTS 3,806,828  4/1974  Johnson ............................... 360/66
4,191,977  3/1980  Lewkowicz .......................... 360/66

Primary Examiner—Vincent P. Canney
Attorney, Agent, or Firm—Sughrue, Mion, Zinn, Macpeak, and Seas

[57] ABSTRACT

Inverting and non-inverting amplifiers are used to apply opposite phase bias signals to either side of a recording head. A recording signal is provided to one of the amplifiers, and the erase head is coupled between ground and the side of the recording head opposite the one amplifier.

4 Claims, 3 Drawing Figures

MAGNETIC RECORDING DEVICE

BACKGROUND OF THE INVENTION

This invention relates to magnetic recording devices, and more particularly to a recording signal, recording bias and erasing signal supply circuit.

In a conventional supply circuit for this type, as shown in FIG. 1, the output of a recording bias oscillator 1 is applied through a transformer 5 to a recording head 3 and a erasing head 4 in a parallel mode. A DC blocking capacitor $C_2$ and a bias current controlling variable resistor $VR_1$ are provided in the supply circuit. A signal from a recording signal source 2 is applied to the non-inversion input terminal of an operational amplifier 6 and the output of the latter 6 is applied through a trap circuit consisting of a coil $L_1$ and a capacitor $C_1$ to the recording head 3. Resistors $R_1$ and $R_2$ form a feedback circuit for the operational amplifier 6.

The arrangement of the supply circuit is disadvantageous in that the recording bias current is liable to be affected by the characteristics of a magnetic circuit for the erasing head, especially current distortion. Also, since the trap circuit is provided to prevent the leakage of the recording bias signal into the signal source 2, the upper limit of recording frequency response is limited. Accordingly, in order to improve the recording frequency response, it is necessary to increase the recording bias frequency, and therefore the circuit design is limited.

SUMMARY OF THE INVENTION

Accordingly, an object of this invention is to provide a magnetic recording device in which the above-described difficulties are eliminated and the output power of the recording bias circuit is increased.

A significant feature of the magnetic recording device according to the invention resides in that an inversion amplifier and a non-inversion amplifier which receive the output of a recording bias oscillator are provided, the outputs of these amplifiers are applied to two respective terminals of the recording head, the erasing head is connected between one terminal of the recording head and a reference potential (ground), and a recording signal is applied to an input terminal of the amplifier the output of which is connected to the other terminal of the recording head.

BRIEF DESCRIPTION OF THE INVENTION

This invention will be described with reference to the accompanying drawings, in which.

DETAILED DESCRIPTION OF THE INVENTION

Figure 1:
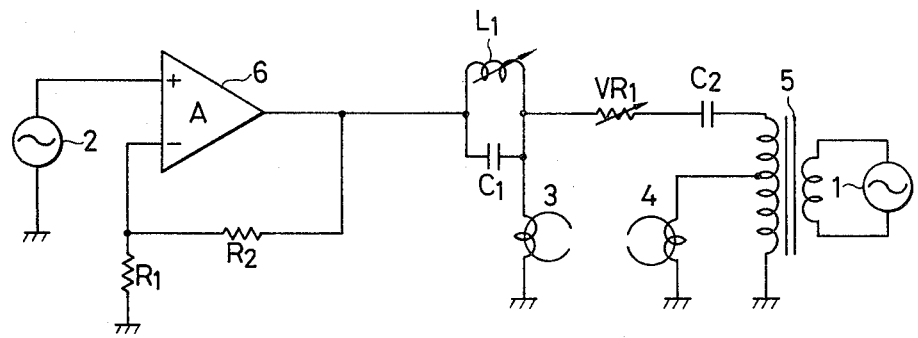
FIG. 1 is a circuit diagram showing a supply circuit for a recording head and an erasing head in a conventional magnetic recording device.
Figure 2:
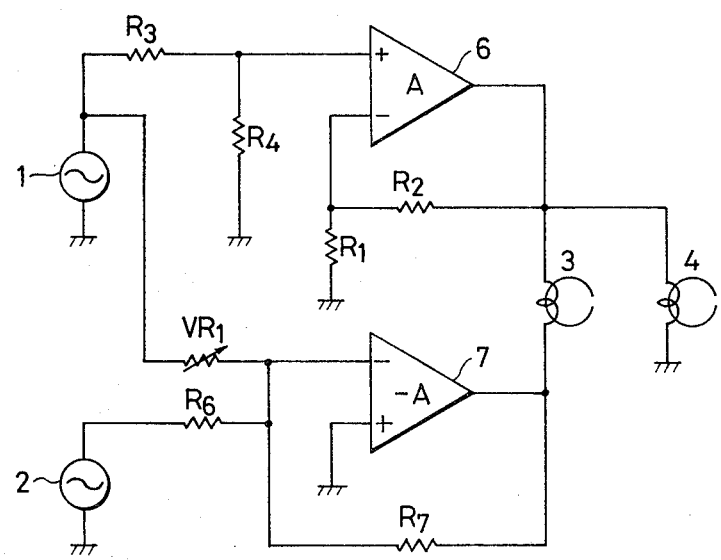
FIG. 2 is a circuit diagram showing a first embodiment of this invention.

FIG. 2 is a circuit diagram showing one example of a magnetic recording device according to the invention. In FIG. 2 and FIG. 1, like parts are designated by like reference numerals or characters. A signal from a recording bias oscillator 1, after being subjected to voltage division by resistors $R_3$ and $R_4$ and being amplified at an amplification factor defined by a feedback circuit consisting of resistors $R_1$ and $R_2$, is provided at the output of a non-inversion amplifier 6. The output of the amplifier 6 is applied to one terminal of a recording head 3 and one terminal of an erasing head 4. The other terminal of the erasing head 4 is grounded; that is, it is at a reference potential.

The recording bias signal is applied through a variable resistor $VR_1$ to the inversion input terminal of an inversion amplifier 7. The signal thus applied is subjected to inversion and amplification at an amplification factor which is defined by a feedback circuit consisting of the variable resistor $VR_1$ and a resistor $R_7$, and the output of the inversion amplifier 7 is applied to the other terminal of the recording head 3. Thus, a so-called "BTL (balanced transformer-less) drive arrnagement" is formed in which the bias signals in positive and negative phases are simultaneously applied to the two terminals of the recording head 3.

A recording signal from a recording signal source 2 is applied through a resistor $R_6$ to the inversion amplifier 7, where it is amplified and mixed with the inverted and amplified recording bias signal, and the resultant signal is applied to the recording head 3.

If an output impedance at the output terminal of the non-inversion amplifier 6 is set much lower than the impedance of the recording head, then the recording signal supplied to the recording head is absorbed at the output terminal of the non-inversion amplifier 6. Therefore, the recording current flows in the recording head, but is not applied to the erasing head. Because of the low output impedance of the amplifier 6, even if the recording head 3 and the erasing head 4 are both connected to the output (low impedance) of the amplifier 6, the recording head current is not affected by current distortion due to the erasing head 4.

Since the non-inversion input terminal of the inversion amplifier 7 is grounded, the inversion input terminal is "virtually grounded". Therefore, the leakage of the recording bias signal voltage into the recording signal source (2) side is prevented.

Figure 3:
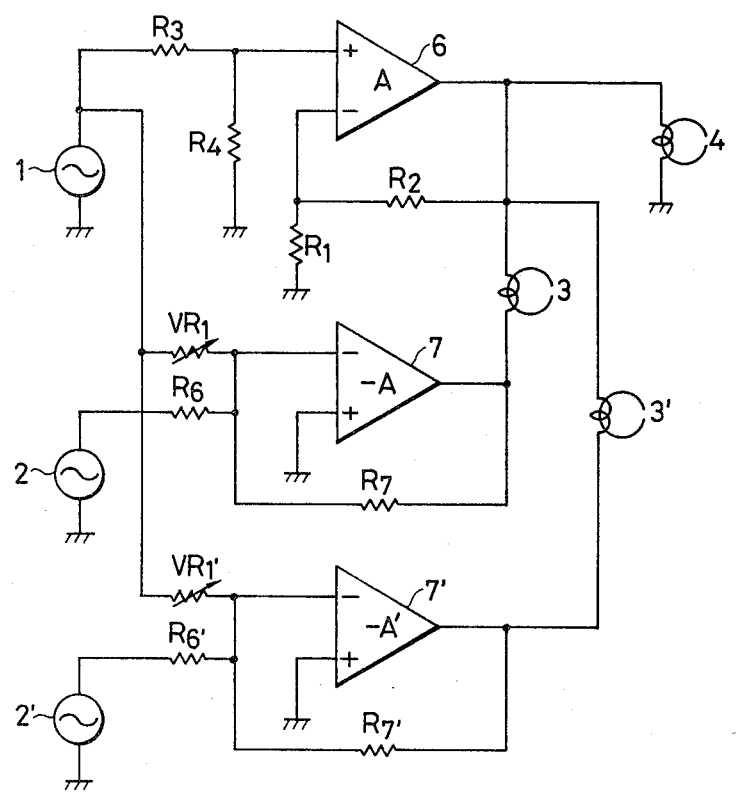
FIG. 3 is a circuit diagram of a second embodiment of the invention.

Another example of the magnetic recording device according to the invention is shown in FIG. 3, in which those components which have been previously described with reference to FIG. 2 are therefore similarly designated. In this example, plural channel signals 2 and 2', are recorded. Recording the signals 2 and 2 $\propto$ can be achieved by providing, in addition to the inversion amplifier 7, another inversion amplifier 7'. The recording signals from the recording signal sources, after being mixed with the bias signal, are applied to the inversion input terminals of respective inversion amplifiers 7 and 7'. This circuit is effective especially for a magnetic recorder such as a compact cassette recorder, a microcassette recorder or a multi-channel recorder for business in which a plurality of channels are to be erased simultaneously.

In FIGS. 2 and 3, the variable resistors $VR_1$ and $VR_1'$ are used to correct the fluctuations in bias current characteristics of the recording heads 3 and 3', respectively. A recording bias current and an erasing current suitable for a given magnetic tape can be obtained by adjusting the voltage division ratio provided by the resistors $R_3$ and $R_4$ and the amplification factor of the non-inversion amplifier which is obtained by the resistors $R_1$ and $R_2$. The voltage division ratio and the amplification factor can be readily controlled as is well known by using variable means such as switches (not shown).

As is apparent from the above description, according to this invention, with a simple arrangement the bias current and the erasing current can be supplied at a low distortion factor and a recording bias current and an erasing current suitable for a given magnetic tape can be obtained readily and efficiently. Since the use of the bias trap circuit is eliminated according to the invention, the recording frequency response is improved. Furthermore, because of the BTL drive, a higher power recording bias signal can be supplied with the same electric source.

It can be appreciated from the foregoing description that operational amplifiers are useable for the inversion or non-inversion amplifiers as described in conjunction with FIGS. 2 and 3.

What is claimed is:

1. A magnetic recording device comprising:
   a source of recording bias signal;
   an inverting first amplifier and a non-inverting second amplifier receiving said bias signal, each amplifier having an output;
   a recording head having first and second terminals connected across said amplifier outputs;
   an erasing head which is connected between said first terminal of said recording head and a reference potential; and
   a recording signal source for applying a recording signal to an input terminal of the amplifier which has its output connected to the second terminal of said recording head.

2. A device as claimed in claim 1, in which the amplifier to which said recording signal is applied has an output impedance much lower than an impedance of said recording head.

3. A device as claimed in claim 1, wherein said amplifier to which said recording signal is applied is said first amplifier.

4. A device as claimed in claim 1, further comprising a second recording signal source, a third amplifier receiving said second recording signal, and a second recording head having one terminal connected to the output of said third amplifier and its other terminal coupled to the first terminal of said first recording head.

* * * * *